(12) United States Patent
Kebre

(10) Patent No.: US 8,104,725 B1
(45) Date of Patent: Jan. 31, 2012

(54) LIFTING DEVICE FOR LITTER BOXES

(76) Inventor: Barbara M. Kebre, Covina, CA (US)

( * ) Notice: Subject to any disclaimer, the term of this patent is extended or adjusted under 35 U.S.C. 154(b) by 215 days.

(21) Appl. No.: 12/561,976

(22) Filed: Sep. 17, 2009

(51) Int. Cl.
*F16M 11/26* (2006.01)

(52) U.S. Cl. .................. 248/188.5; 248/164; 248/188.1; 248/188.2; 248/439

(58) Field of Classification Search .............. 248/188.5, 248/164, 439, 440.1, 346.01, 188.6, 188.1, 248/188.2; 108/56.1; 182/186.6
See application file for complete search history.

(56) References Cited

U.S. PATENT DOCUMENTS

| | | | | |
|---|---|---|---|---|
| 2,980,287 A | * | 4/1961 | Fisher | 312/306 |
| 3,091,503 A | * | 5/1963 | Fisher | 312/71 |
| 3,174,722 A | * | 3/1965 | Alm | 254/93 HP |
| 3,282,566 A | * | 11/1966 | Clarke | 254/122 |
| 3,558,103 A | * | 1/1971 | Lodige | 254/122 |
| 3,621,817 A | | 11/1971 | Printz | |
| 3,635,173 A | | 1/1972 | Ruben | |
| 3,659,913 A | * | 5/1972 | Waldron et al. | 312/71 |
| 3,806,092 A | * | 4/1974 | Richards | 254/122 |
| 4,215,877 A | * | 8/1980 | Pritchett | 280/652 |
| 4,278,249 A | * | 7/1981 | Forrest | 482/10 |
| 4,764,075 A | * | 8/1988 | Cox et al. | 108/136 |
| 5,184,575 A | | 2/1993 | Reinartz | |
| 5,785,000 A | | 7/1998 | Barbary | |
| 5,921,596 A | | 7/1999 | Sheriff et al. | |
| 5,924,383 A | | 7/1999 | Smith | |
| 6,997,137 B1 | | 2/2006 | Ricke | |
| 7,228,818 B2 | * | 6/2007 | Lynch | 119/168 |
| D569,053 S | | 5/2008 | Lee | |

\* cited by examiner

*Primary Examiner* — Amy J Sterling

(57) ABSTRACT

A lifting device for raising and lowering a litter box comprising a first platform for placing on a ground surface and a second platform for supporting the litter box, wherein the second platform is positioned above the first platform; one or more support components attached to the first platform to the second platform; wherein the second platform can move between an up position wherein the second platform is raised above the first platform a certain distance and a down position wherein the second platform contacts the first platform, wherein the second platform is biased in the up position caused by the support components and the second platform can be secured in the down position via a locking means.

15 Claims, 3 Drawing Sheets

LIFTING DEVICE FOR LITTER BOXES

FIELD OF THE INVENTION

The p resent invention is directed to an accessory for a litter box, more particularly to a device for raising and lowering a litter box.

BACKGROUND OF THE INVENTION

Litter boxes require a great deal of maintenance. Often pet owners must tend to the litter daily. This can be strenuous for individuals that have difficulty bending over and/or picking up the little box. Lifting the litter box can also be an annoyance for some individuals. The present invention features a lifting device for raising and lowering a litter box. The lifting device enables a user to more easily and comfortably maintain a litter box.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
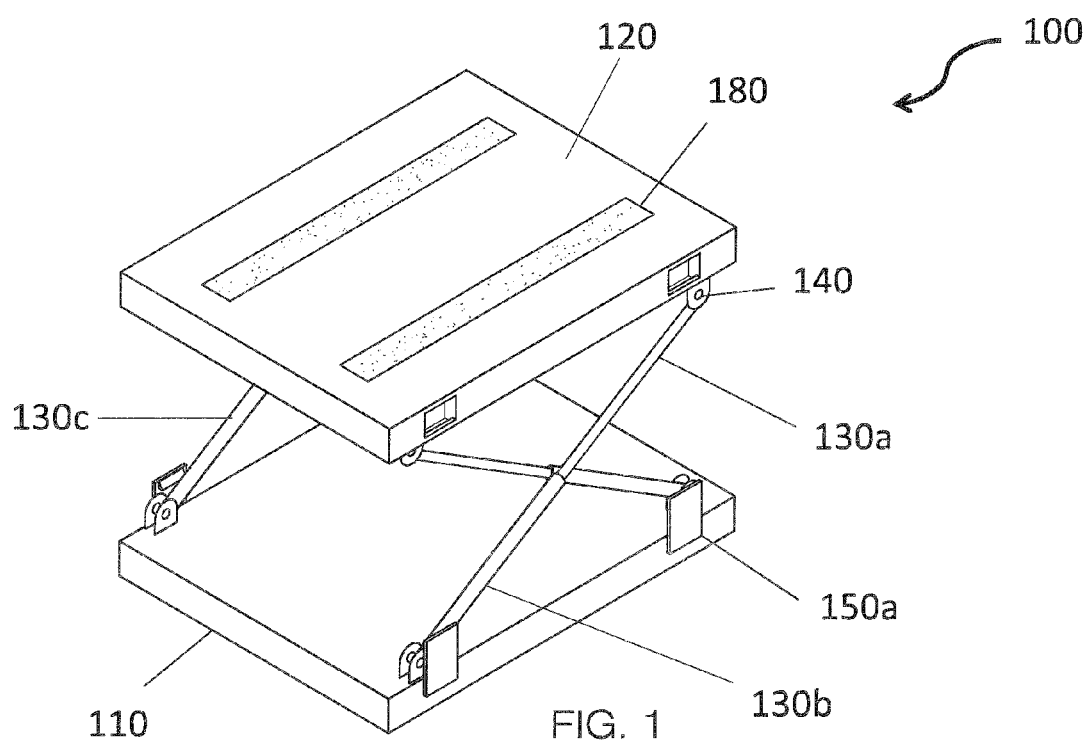
FIG. 1 is a perspective view of the lifting device of the present invention.
Figure 2:
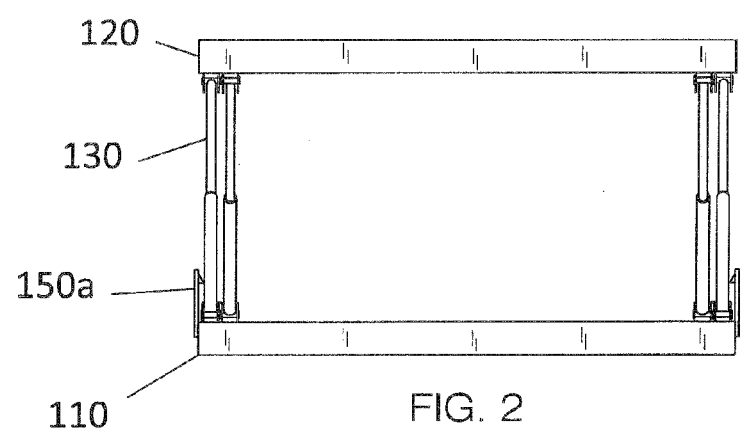
FIG. 2 is a front view of the lifting device of FIG. 1.

Referring now to FIGS. 1-6, the present invention features a lifting device 100 for raising and lowering a litter box 101. The device 100 can help raise the litter box 101 to a height that is convenient for cleaning.

The lifting device 100 comprises a first platform 110 for placing on a ground surface (e.g., the floor in a home). The device 100 further comprises a second platform 120 for supporting the litter box 101. The second platform is positioned above the first platform 110 (a certain distance apart). Generally, the first platform 110 is parallel to the second platform 120.

The first platform 110 and second platform 120 are connected by one or more support components 130. In some embodiments, the support components 130 comprise springs. In some embodiments, the support components 130 comprise hinges (e.g., or are attached to platforms via hinges 140). In some embodiments, the support components 130 comprise an inner shaft 136 telescopically received in an outer shaft 137. In some embodiments, a spring component 138 is disposed in the inner cavity of the outer shaft 137, wherein the spring 138 functions to push the inner shaft 136 out of the outer shaft 137 (see FIG. 5).

In some embodiments, a first support component 130a has a first end attached to the first platform 110 (e.g., on a first side) and a second end attached to the second platform 120 (e.g., on a first side). In some embodiments, a second support component 130b has a first end attached to the first platform 110 (e.g., on a first side) and a second end attached to the second platform 120 (e.g., on a first side). In some embodiments, the first support component 130a crosses the second support component 130b, for example the first end of the first support component 130a is attached to the first side of the first platform 110 near a third side of the first platform 110, the first end of the second support component 130b is attached to the first side of the first platform 110 near a fourth side of the first platform 110, the second end of the first support component 130a is attached to the first side of the second platform 120 near a third side, and the second end of the second support component 130b is attached to the first side of the second platform 120 near a fourth side (see FIG. 1).

In some embodiments, the first ends of the support components 130 are attached to the first platform 110 and the second ends are attached to the second platform 120. The ends of the support components 130 may be attached to the platforms via hinges 140. In some embodiments, the ends of the support components are slidably attached to the platforms via slots in the first platform 110 and/or second platform 120. The slots may allow for movement (e.g., lateral) of the ends of the support components 130, for example the first end of the first support component 130a can slide along a portion of the first side of the first platform 110. In some embodiments, the sliding movement can be helpful when the second platform 120 is being raised. For example, the ends of the support components 130 may slide, which helps lift the second platform 120 above the first platform 110.

In some embodiments, a third support component 130c has a first end attached to the first platform 110 (e.g., on a second side) and a second end attached to the second platform 120 (e.g., on a second side). In some embodiments, a fourth support component has a first end attached to the first platform 110 (e.g., on the second side) and a second end attached to the second platform 120 (e.g., on the second side). In some embodiments, the third support component 130c crosses the fourth support component, for example the first end of the third support component 130c is attached to the second side of the first platform near a third side of the first platform 110, the first end of the fourth support component is attached to the second side of the first platform 110 near a fourth side of the first platform 110, the second end of the third support component 130c is attached to the second side of the second platform 120 near a third side, and the second end of the fourth support component is attached to the second side of the second platform near a fourth side.

Figure 3:
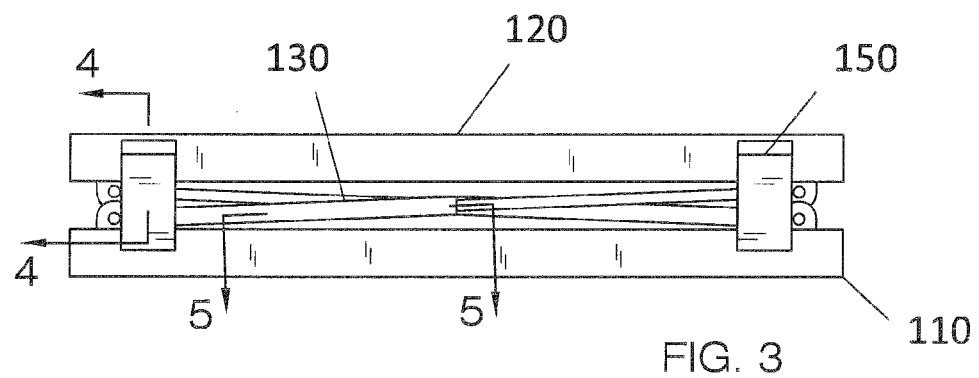
FIG. 3 is a side view of the lifting device of FIG. 1.
Figure 4:
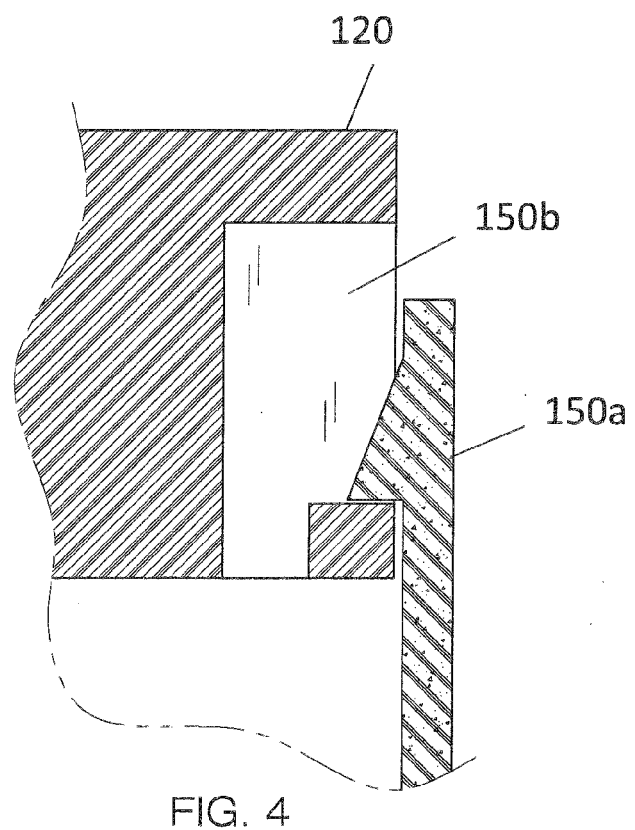
FIG. 4 is a side cross sectional view of the lifting device of FIG. 3.
Figure 5:
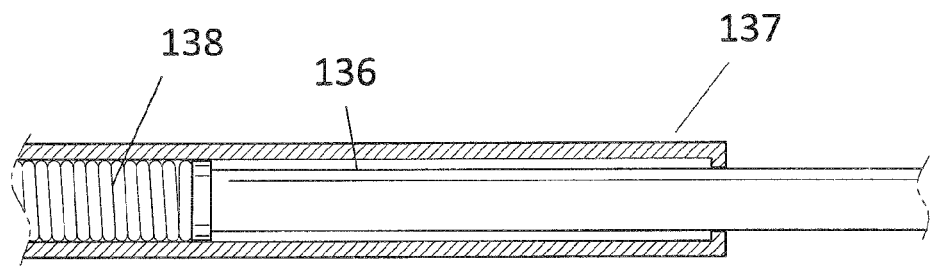
FIG. 5 is a top cross sectional view of the lifting device of FIG. 3.
Figure 6:
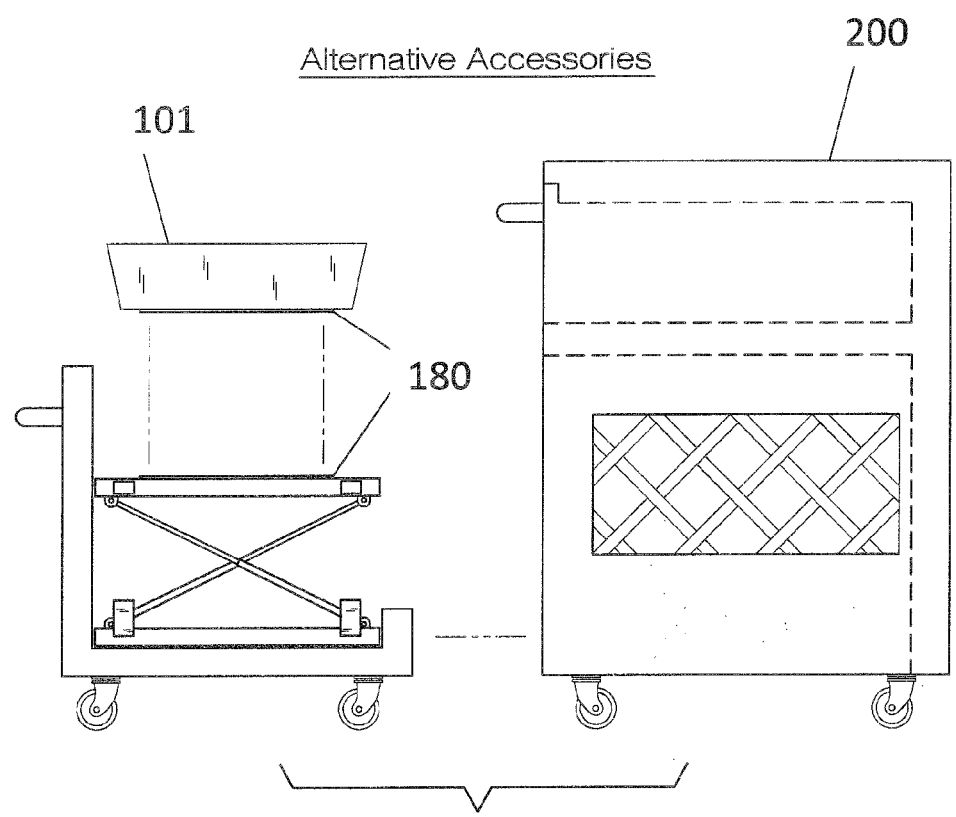
FIG. 6 is a side view of accessories for the lifting device of the present invention.

The second platform 120 can move between an up position and a down position. FIG. 1 illustrates the up position and FIG. 3 illustrates the down position. In the down position, the second platform 120 is near or contacts the first platform 110. In the up position, the second platform 120 is raised above the first platform 110. The second platform 120 is biased in the up position caused by the support components 130. In some embodiments, the second platform 120 is biased in the up position caused by springs 138 of the support components 130. The second platform 120 can be secured in the down position via a locking means. In some embodiments, the locking means includes a hook mechanism, a tie mechanism, a clip mechanism, a snap mechanism, a clamp mechanism, the like, or a combination thereof. For example, a first clamp component 150a is disposed on the first platform 110 that engages a second clamp component 150b disposed on the second platform 120. The second platform 120 can be pushed down to the first platform 110 such that the clamp components 150 engage each other. The clamp components can be disengaged if the user wishes to raise the second platform 120 to the up position again. In some embodiments, the second clamp component 150b is a hole into which the first clamp component 150a can be secured (see FIG. 4).

In some embodiments, the second platform 120 is between about 0 to 5 inches above the first platform 110. In some embodiments, the second platform 120 is between about 5 to 10 inches above the first platform 110. In some embodiments, the second platform 120 is between about 10 to 15 inches above the first platform 110. In some embodiments, the second platform 120 is between about 15 to 20 inches above the first platform 110. In some embodiments, the second platform 120 is more than about 20 inches above the first platform 110.

In some embodiments, the device 100 further comprises a securing means 180 to help secure the little box atop the second platform 120. In some embodiments, the securing means 180 includes straps (e.g., fabric), a hook-and-loop fastener, a clamp, the like, or a combination thereof.

In some embodiments, wheels (e.g., caster wheels) are disposed on the bottom surface of the first platform 110 to enable the device 100 to be moved from one place to another. In some embodiments, the device 100 is housed in an exterior housing 200 (see FIG. 6). The housing 200 may position the platforms on a drawer. The platforms can be pulled out via the drawer and raised and/or lowered. In some embodiments, the housing 200 (e.g., the top of the housing) comprises an accessory drawer for storing items.

The lifting device 100 may be constructed from a variety of materials and in a variety of sizes. For example, in some embodiments, the lifting device 100 is constructed from a material comprising plastic, wood, metal, the like, or a combination thereof. The lifting device 100 may be constructed to accommodate any type of litter box.

The following the disclosures of the following U.S. patents are incorporated in their entirety by reference herein: U.S. Pat. No. 3,635,173; U.S. Pat. No. 3,091,503; U.S. Pat. No. 5,921,596; U.S. Pat. No. 5,785,000; U.S. Pat. No. 5,924,383; U.S. Pat. No. 6,997,137; U.S. Pat. No. 3,621,817; U.S. Pat. No. 5,184,575.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A lifting device for raising and lowering a litter box, said lifting device comprising:
   (a) a first platform for placing on a ground surface and a second platform for supporting the litter box, wherein the second platform is positioned above the first platform;
   (b) a first support component having a first end attached to the first platform and a second end attached to the second platform;
   (c) a second support component having a first end attached to the first platform and a second end attached to the second platform;
   (d) a third support component having a first end attached to the first platform and a second end attached to the second platform;
   (e) a fourth support component having a first end attached to the first platform and a second end attached to the second platform;
   wherein the second platform can move between an up position wherein the second platform is raised above the first platform a certain distance and a down position wherein the second platform is parallel to the first platform, wherein the second platform is biased in the up position caused by the support components and the second platform can be secured in the down position via a locking means;
   wherein the support component comprises an inner shaft telescopically received in an outer shaft;
   wherein a spring component is disposed in an inner cavity of the outer shaft, wherein the spring functions to push the inner shaft out of the outer shaft.

2. The lifting device of claim 1, wherein the first end of the first support component is attached to the first platform via a hinge.

3. The lifting device of claim 1, wherein the second end of the first support component is attached to the second platform via a hinge.

4. The lifting device of claim 1, wherein the first end of the second support component is attached to the first platform via a hinge.

5. The lifting device of claim 1, wherein the second end of the second support component is attached to the second platform via a hinge.

6. The lifting device of claim 1, wherein the first end of the first support component is attached to a first side of the first platform and the second end of the first support component is attached to a first side of the second platform.

7. The lifting device of claim 1, wherein the first end of the second support component is attached to a first side of the first platform and the second end of the second support component is attached to a first side of the second platform.

8. The lifting device of claim 1, wherein the first end of the first support component is attached to the first side of the first platform near a third side of the first platform, the first end of the second support component is attached to the first side of the first platform near a fourth side of the first platform, the second end of the first support component is attached to the first side of the second platform near a third side of the second platform, and the second end of the second support component is attached to the first side of the second platform near a fourth side of the second platform.

9. The lifting device of claim 1, wherein the first end of the third support component is attached to a second side of the first platform and the second end of the third support component is attached to a second side of the second platform.

10. The lifting device of claim 1, wherein the first end of the fourth support component is attached to a second side of the first platform and the second end of the fourth support component is attached to a second side of the second platform.

11. The lifting device of claim 1, wherein the first end of the third support component is attached to the second side of the first platform near a third side of the first platform, the first end of the fourth support component is attached to the second side of the first platform near a fourth side of the first platform, the second end of the third support component is attached to the second side of the second platform near a third side, and the second end of the fourth support component is attached to the second side of the second platform near a fourth side.

12. The lifting device of claim 1, wherein the locking means includes a hook mechanism, a tie mechanism, a clip mechanism, a snap mechanism, a clamp mechanism, or a combination thereof.

13. The lifting device of claim 1 further comprising a first clamp component is disposed on the first platform that engages a second clamp component disposed on the second platform.

14. The lifting device of claim 1 further comprising a securing means to help secure the litter box atop the second platform.

15. The lifting device of claim 14, wherein the securing means includes straps, a hook-and-loop fastener, a clamp, or a combination thereof.

* * * * *